(No Model.)
W. ANDREWS.
SADDLE.
No. 384,600. Patented June 19, 1888.
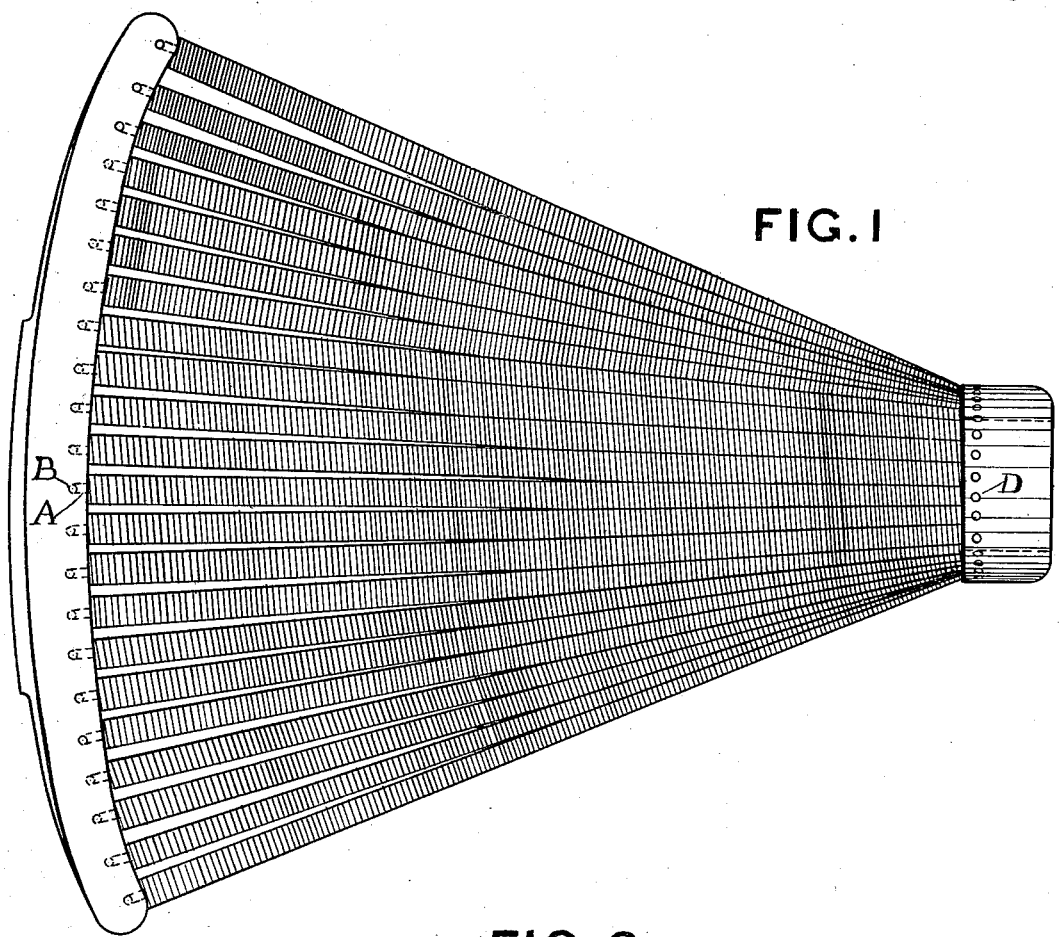
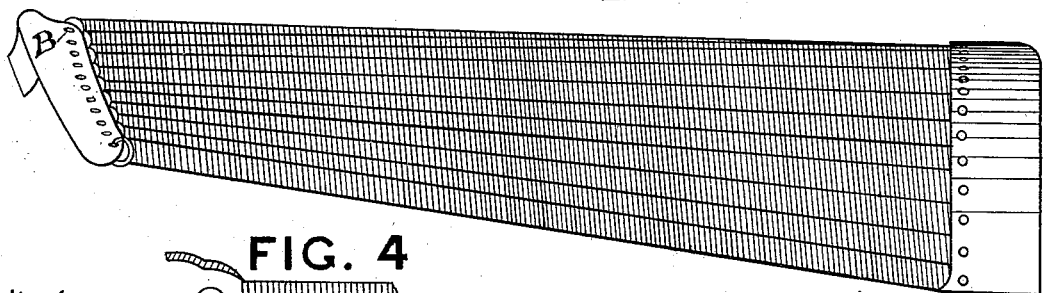

UNITED STATES PATENT OFFICE.

WILLIAM ANDREWS, OF VICTORIA WORKS, VICTORIA ROAD, ASTON, COUNTY OF WARWICK, ENGLAND.

SADDLE.

SPECIFICATION forming part of Letters Patent No. 384,600, dated June 19, 1888.

Application filed January 3, 1887. Serial No. 223,305. (No model.)

*To all whom it may concern:*

Be it known that I, WILLIAM ANDREWS, a subject of Her Majesty the Queen of England, residing at Victoria Works, Victoria Road, Aston, in the county of Warwick, England, have invented new and useful Improvements in Saddles, of which the following is the specification, reference being had to the accompanying drawings.
Hitherto the seats of saddles have been made of leather or other material not capable of extension and contraction.

My invention, in its relation to the saddle part of a bicycle or tricycle, consists in the use of material having these qualities inherent in itself, and also in the construction of the pommel of the saddle in such a manner as, when in combination with my new seat, to form a flap.
I construct my seat of metal, spiral, or other springs. They are stretched between the cantle-plate (or rear end of the saddle) and the pommel, (or front end of the same,) and connected by suitable means to both. The seat so made presents to view a sitting-surface of elastic springs capable of extension and contraction.

When the body presses on the seat, the springs yield and conform to the shape of the part pressing upon them, thus giving a more comfortable and easy seat than any hitherto in use, and having the further advantage of keeping the part of the body cool which is in contact with the seat, owing to the free circulation of air passing throughout the springs.

The cantle-plate is of a curved configuration in transverse section, and when viewed endwise it presents the appearance of an arc of a large circle—that is to say, nearly flat for a space of four inches, more or less, on the crown, and then turning down on each side. This special shape enables me to attach my metal springs or other yielding material to the cantle and to the pommel, thus forming a saddle of such a configuration that the surface presented to the legs of a rider is suitable for preventing irritation of the parts in contact.

Any kind of saddle-plate now in use may be employed in combination with my elastic seat, pommel, and cantle-plate; or brackets (adjustable or otherwise) may be attached to the backbone and neck of a bicycle or post of a tricycle, between which my elastic seat may be extended.

The springs used for making my improved seat may have any transverse section. They may also taper from one end to the other. The metal out of which the springs are made may also have any suitable transverse section.

The drawings accompanying this specification illustrate the method whereby I form my flexible seat.

Figure 1 represents a plan of a seat or saddle formed by connecting one end of a series of helical springs to a cantle-plate or rear end of a saddle, the other end of the springs being connected to a pommel or front end of a saddle. Fig. 2 represents a side elevation of Fig. 1. Fig. 3 represents a helical tapering spring. Fig. 4 represents a parallel helical spring, showing the terminal end formed into a hook, the said hook being passed over a wire bar.

The series of helical springs shown at Fig. 1 is connected to the cantle-plate by means of a hooked end similar to Fig. 3. In some cases I provide a wire or bar on the under side of the cantle-plate, to which the springs are hooked in the manner indicated at Fig. 4. The front or pommel end may in a like manner be provided with a wire or bar, to which the springs are connected, as shown at Fig. 4. Any kind of saddle-plate may be used as a rib or stretcher to connect the cantle-plate to the pommel. The seat or saddle so put together would then be attached to the backbone and neck of a bicycle or post of a tricycle.

In some cases I pass the one hook, A, of each spring through a hole, B, in the cantle-plate, and the other hook, C, through a hole, D, in the pommel.

It will be observed that Fig. 3 represents a tapered helical spring. In some cases I prefer to use such tapered springs, which may graduate to any desired reduced diameter. By using tapered springs I should avoid too much crowding together at the pommel end.

When using strips of india-rubber or other resilient material in lieu of metal springs, I attach hooks at and on each end of the said strips, and by means of these hooks connect the strips to the cantle-plate and the pommel by passing the hooks through holes provided in the cantle-plate and the pommel, or connecting them to wire bars under the cantle-plate and the pommel in a similar manner to that by which the metal springs are connected, as shown at Fig. 4. The strips may lie in a similar manner to the helical springs shown at Fig. 1, or they may be crossed or interlaced in any manner desired, whereby a resilient seat would be formed of such a shape and construction as to admit air through the interstices to the body of the person using the seat.

I have not provided a sketch of the seats made out of strips or other equivalents, as the matter is so simple that a manuscript explanation seems sufficient.

In some cases I should provide a piece of reticulated resilient substance, which may be cut into the required shape, and thereafter connected to the cantle-plate and the pommel by the means hereinbefore referred to, or by any other suitable equivalent means.

I claim—

A saddle for a bicycle or tricycle having its seat made entirely of springs or equivalent elastic material, as described and illustrated.

In testimony whereof I have hereunto signed my name in the presence of two subscribing witnesses.

WILLIAM ANDREWS.

Witnesses:
ALF. WM. TURNER,
WILLIAM VICTOR WYLDES.